United States Patent [19]

Bruder

[11] Patent Number: 5,572,908
[45] Date of Patent: Nov. 12, 1996

[54] RATCHET MECHANISM FOR TELESCOPE DEVICES ON TOY VEHICLES

[75] Inventor: Paul H. Bruder, Fürth-Burgfarrnbach, Germany

[73] Assignee: Bruder Spielwaren GmbH & Co KG, Germany

[21] Appl. No.: 359,077

[22] Filed: Dec. 19, 1994

[30] Foreign Application Priority Data

Jan. 27, 1994 [DE] Germany .............. 9401371 U

[51] Int. Cl.$^6$ ........................... G05G 5/18
[52] U.S. Cl. ............... 74/577 R; 74/575; 74/577 SF; 74/577 M; 74/586; 446/426
[58] Field of Search ............... 74/575, 577 R, 74/586, 577 M, 577 SF, 29, 34, 109, 422; 192/43.1, 56.1; 248/354.7, 188.5; 446/424, 425, 426, 427

[56] References Cited

U.S. PATENT DOCUMENTS

| | | | |
|---|---|---|---|
| 1,371,590 | 3/1921 | Woodward | 74/577 M |
| 1,928,048 | 9/1933 | Currens | 74/577 M |
| 2,649,179 | 8/1953 | Barkdoll | 74/577 |
| 5,052,303 | 10/1991 | Edminster | 74/422 |
| 5,183,140 | 2/1993 | Nicoll | 192/56.1 |

*Primary Examiner*—Charles A. Marmor
*Assistant Examiner*—Chong H. Kim
*Attorney, Agent, or Firm*—Laff, Whitesel, Conte & Saret, Ltd.

[57] ABSTRACT

A ratchet mechanism for telescope devices on toy vehicles comprises a manually drivable driving gearwheel rotatably positioned on a telescope base body, a rack on the telescopic arm, the rack engaging with the driving gearwheel, and a pawl of ratcheting engagement with a tooth gap of the driving gearwheel for the telescopic arm to be fixed in different positions of displacement on the telescopic base body. The pawl consists of elastically flexible plastics material so that on the one hand it ratchets over the teeth of the driving gearwheel upon actuation of the driving gearwheel for the extraction of the telescopic arm and that on the other hand it is elastically deformable upon actuation of the telescopic arm in the direction of retraction. The pawl then ratchets over the teeth of the driving gearwheel while releasing the telescopic arm in the latter's direction of retraction.

12 Claims, 2 Drawing Sheets

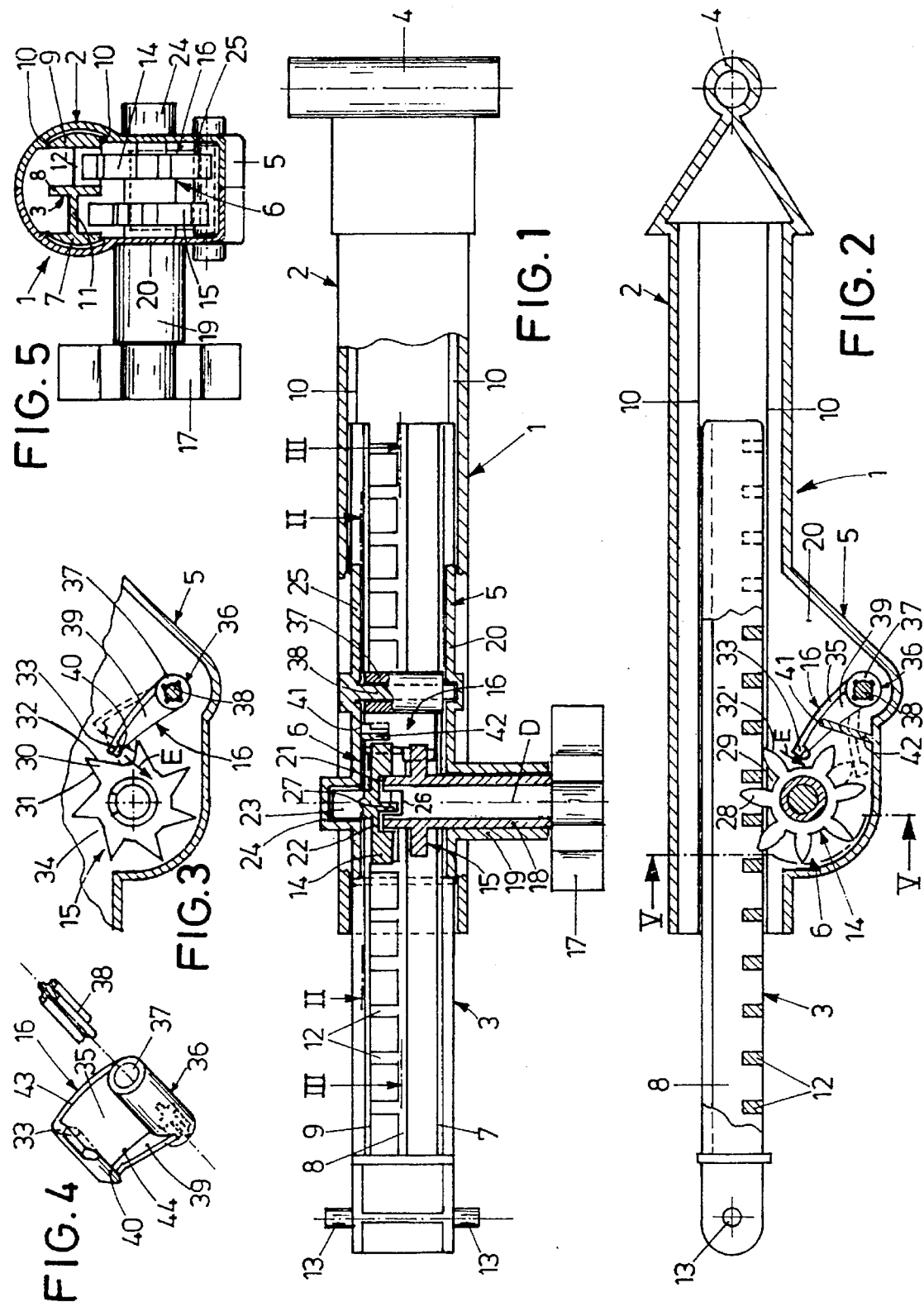

5,572,908

RATCHET MECHANISM FOR TELESCOPE DEVICES ON TOY VEHICLES

BACKGROUND OF THE INVENTION

1. Field of the Invention

The invention relates to a ratchet mechanism for telescope devices on toy vehicles, in particular for telescope supports of crane jibs of toy crane trucks, comprising a manually drivable driving gearwheel rotatably positioned on a telescope base body, a rack-type row of teeth engaging with the driving gearwheel and disposed on a telescope arm which is lodged for longitudinal displacement in the telescope base body, and a pawl being in ratcheting engagement with a tooth gap between two teeth of the driving gearwheel for the telescopic arm to be fixed in different positions of displacement on the telescope base body.

2. Background Art

Ratchet mechanisms of the generic type are very often used in toy vehicles for the most various telescope devices. The use in telescopable crane jibs as such or in laterally extractable supports for the improvement of the stability of a crane truck is to be mentioned in addition to the example mentioned.

In all these possible applications the ratchet mechanism has different purposes, namely, on the one hand, to ensure the drive of the extractable telescopic arm and to fix the telescopic arm in positions of displacement of grid-type sequence on the telescope base body. A mechanism of this type as conventionally used has a manually drivable driving gearwheel which engages with a rack-type row of teeth on the displaceable telescopic arm. A pawl engaging with the driving gear wheel in the way of a ratchet is provided for blocking the telescopic arm; the pawl is suitably actuated, for instance by a spring, in the direction of engagement so as to ensure the mechanism to be reliably blocked in a direction of rotation of the driving gearwheel—as a rule the direction of rotation assigned to the retraction of the telescopic arm.

In order for the telescopic arm to be able to move in the blocked direction, the pawl must be disengaged from the driving gearwheel, which may for instance be done by an externally actuatable release lever. But this causes considerable difficulties in the handling especially by children, since two actuating operations have to be performed simultaneously.

An even more important disadvantage of such constructions resides in the fact that the pawl causes the driving gearwheel and consequently the associated telescopic arm to be blocked inflexibly at least in one direction of movement. If a child tries to push in the telescopic arm inappropriately, directly forcing it in without actuating the driving gearwheel, there is the risk that the pawl breaks and the blocking effect of the ratchet mechanism gets lost, in which case the toy vehicle is as a rule no longer of any use.

SUMMARY OF THE INVENTION

Proceeding from the foregoing, it is the object of the invention to further develop the ratchet mechanism of the generic type such that any damage to the pawl, even when operated inappropriately, can be avoided reliably.

This object is solved by the pawl consisting of elastically flexible plastics so that on the one hand, upon the actuation of the driving gearwheel for the extraction of the telescopic arm, it ratchets over the teeth of the driving gearwheel while being deflected counter to the direction of engagement, and on the other hand, upon the actuation of the telescopic arm in the direction of retraction by a force exceeding a limit, it is elastically deformable in a defined manner such that the pawl again ratchets over the teeth of the driving gearwheel while releasing the telescopic arm in the latter's direction of retraction. The pawl being formed of elastically flexible plastics, this provides for the possibility that upon any excessive actuation of the telescopic arm in the direction of retraction by a force exceeding a certain limit, the pawl is deformed in a defined manner such that it can ratchet over the teeth of the driving gearwheel, releasing the driving gearwheel and thus the telescopic arm in the latter's direction of retraction. As a result of its defined flexibility, the pawl can keep its orderly function. Typically, the solution according to the invention is a solution in terms of plastics technology making use of the specific properties of plastics material such as the enormous elastic deformability.

As a result of the measures according to which the pawl is a plate preferably slightly bent in the direction of engagement about a neutral axis extending parallel to the axis of rotation of the driving gearwheel, which plate is provided with a bearing sleeve on its bearing end, the bearing sleeve resting non-rotatably on an elastically twistable bearing axle on the telescope base body, the design and positioning of the pawl is realized in a constructionally simple way, the restoring forces regularly inherent in any plastics material being used for the pawl always to be reliably biased in its direction of engagement with the driving gearwheel, in particular as a result of the pawl's being lodged against rotation on an elastically twistable bearing axle on the telescope base body.

An advantageous configuration of the ratchet mechanism consists in that a stop is provided on the telescope base body upstream of the side of the pawl oriented in the direction of engagement, the stop defining the depth of engagement of the pawl with the tooth gap of the driving gearwheel such that, upon the application of a force exceeding the limit in the direction of retraction of the telescopic arm, the pawl is disengageable by intrinsic elastic deformation for the release of the driving gearwheel counter to the direction of engagement.

By reason of the teeth of the driving gearwheel being provided with a blind-hole-type recess extending parallel to the flanks and the resulting increase in flexibility of the teeth, the disengaging motion of the pawl upon the application of a force exceeding the limit in the push-in direction of the telescopic arm is supported and consequently the release of the driving gearwheel is facilitated.

In keeping with an embodiment of the ratchet mechanism, a stop is provided on the telescope base body upstream of the lateral edge of the side of the pawl oriented in the direction of engagement, which stop constitutes an abutment for the pawl upon the latter's deformation in the direction of engagement, the pawl being deformable upon the application of a force exceeding the limit in the direction of retraction of the telescopic arm in such a way that the pawl is displaceable past the stop in the direction of engagement beyond its position of engagement with the driving gearwheel. The pawl cooperates in a defined manner with the stop on the telescope base body, the stop supporting only the edge of the pawl. On the one hand, this stop results in that a high blocking effect is produced in the push-in direction of the telescopic arm. On the other hand, the exclusively lateral arrangement of the stop makes it possible for mutual support of the stop and the pawl to be released after a correspondingly strong deformation of the pawl upon the application of a strong force from outside in the push-in direction of the telescopic arm, the pawl being displaceable past the stop in the direction of engagement beyond its position of engagement relative to the driving gearwheel. This helps achieve the release of the driving gearwheel mentioned at the outset and thus of the telescopic arm into the latter's push-in direction.

Preferred embodiments of the invention relate to an unblocking gearwheel advantageously provided for appropriately releasing the pawl's engagement with the driving gearwheel. Being coupled with the driving gearwheel, the unblocking gearwheel is actuated together with the latter by way of a handwheel mounted on the outside of the telescope base body so that the retraction and extraction of the telescopic arm can be managed by a single common operating element. The problems mentioned at the outset regarding the simultaneous actuation of two operating elements for the retraction of the telescopic arm do not occur any longer.

Attention is drawn to the fact that the construction using an unblocking gearwheel can of course be employed in an especially advantageous manner in combination with the deformable pawl according to the invention. But regardless of this, the construction using an unblocking gearwheel is also applicable for improving the convenience of operation in ratchet mechanisms having conventional pawls, the function of protection against rupture of the pawl being however dropped.

Further features, details and advantages of the invention will become apparent from the ensuing description of an example of embodiment of the subject matter of the invention taken in conjunction with the drawing.

BRIEF DESCRIPTION OF THE DRAWING

FIG. 1 is a partially cut illustration from below of a telescope support,

FIG. 2 is a section of the telescope support along the section line II—II of FIG. 1, FIG. 3 is a section of the telescope support along the section line III—III of FIG. 1, FIG. 4 is a perspective exploded view of the pawl comprising the bearing axle of the telescope support according to FIG. 1, FIG. 5 is a section along the section line V—V according to FIG. 2.

DESCRIPTION OF THE PREFERRED EMBODIMENT

Figure 6:
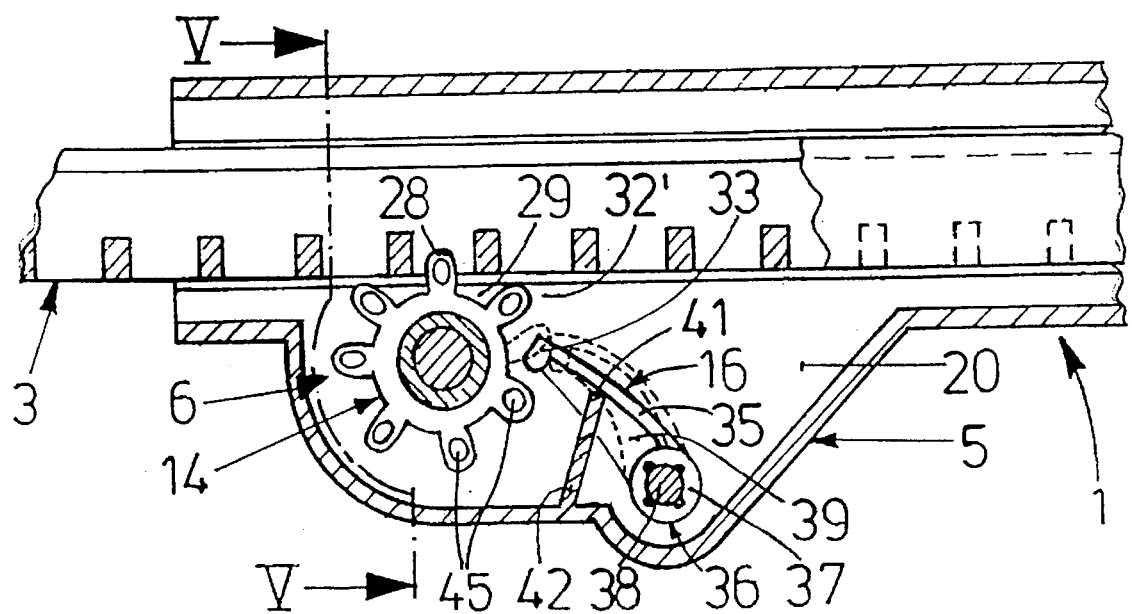
FIG. 6 is a partial section of the telescope support in analogy to FIG. 2 having a ratchet mechanism differing in design from FIGS. 1 to 5.

The telescope support 1 illustrated in FIGS. 1, 2 and 5 for a crane jib on toy crane trucks has a telescope base body 2 and a telescopic arm 3 guided therein for longitudinal displacement. The telescope base body 2 is substantially tubular, a bearing sleeve 4 being formed on its end for the articulation of the telescope support 1 for instance on the superstructure of a toy crane truck. Upstream of its end turned away from the bearing sleeve 4, the telescope base body 2 has a convexity 5 on its bottom, the convexity 5 expanding downward in the form of a box and accommodating the ratchet mechanism referenced as 6.

The telescopic arm 3 has a substantially rectangular outer cross-sectional area (FIG. 5) essentially defined by three vertical webs 7, 8, 9 extending longitudinally. The two external webs 7, 9 run in longitudinal guides 10 on the inside of the tubular telescope base body 2. One lateral web 7 is coupled with the central web 8 by way of a horizontal connecting web 11. The connection of the central web 8 with the second external web 9 is made by regularly spaced tooth webs 12 extending vertically in the transverse direction and forming a rack-type row of teeth on the telescopic arm 3. On its outside end the telescopic arm is provided with two axle stubs 13 projecting outward in the transverse direction and producing the articulation for instance on the crane jib of the superstructure of a toy crane truck.

A first embodiment of the ratchet mechanism 6 according to FIGS. 1 to 5 comprises a driving gearwheel 14, an unblocking gearwheel 15 as well as a pawl 16 as essential components. An external handwheel 17 non-rotatably joined to a tubular shaft 18 is provided for the actuation of the ratchet mechanism 6. The shaft 18 lodges rotatably in a sleeve-shaped bearing projection 19 integrally formed on one side wall 20 of the convexity 5. The unblocking gearwheel 15 is integrally formed on the shaft 18 where the latter overlaps the connecting web 11. The shaft 18 ends above the center of the tooth webs 12 of the telescopic arm 3. An annular groove 22 of the driving gearwheel 14 is placed on the edge 21 on the shaft front side, whereby the shaft 18, the driving gearwheel 14 and the unblocking gearwheel 15 are positioned coaxially with each other. In addition, on its side turned away from the shaft 18, the driving gearwheel 14 is rotatably supported by means of an integrally formed axle stub 23 lodging in a cup-shaped bulging 24 on the second side wall 25 of the convexity 5. Further, the driving gearwheel 14 and the unblocking gearwheel 15 are rotatable one in relation to the other by a defined angle of rotation. This is accomplished by means of a recess 26 in the edge 21 on the front side of the shaft 18, a driving web 27 on the annular groove 22 of the driving gearwheel 14 engaging with this recess 26. The recess 26 extending by an angle at circumference exceeding that of the driving web 27, this serves to achieve the mentioned rotatability by a defined angle of rotation of the driving gearwheel 14 relative to the unblocking gearwheel 15. The angle of rotation is about 15° to 20°. As further seen in FIGS. 2 and 3, the driving gearwheel 14 and the unblocking gearwheel 15 are of identical pitch, the shape of the teeth of the driving gearwheel 14 corresponding to that of conventional rack-and-pinion gears. One tooth 28 of the driving gearwheel 14 at a time engages with a tooth gap 29 between two tooth webs 12 of the telescopic arm 3 (FIG. 2.).

The shape of the teeth 30 of the unblocking gearwheel 15 is triangular in a section at right angles to the axis of rotation D, one flank 31 being steep, the other flank 32 being flat. The flat flank 32 may have a slightly convex outward bulging—which is not shown in detail in FIG. 3. The purpose of this arrangement will be specified in detail below.

The pawl 16 of the ratchet mechanism 6 is disposed below the telescopic arm 3 upstream of the driving gearwheel 14 and the unblocking gearwheel 15 seen in the longitudinal direction. The free end 33 of the pawl 16 engages with a gap 34 between two teeth 28 and 30, respectively, of the driving gearwheel 14 and the unblocking gearwheel 15 (direction of engagement E). The pawl 16 has a slightly bent plate body 35 of which the bearing end 36 turned away from the free end 33 is provided with a bearing sleeve 37. The latter's left half referred to FIG. 4, which is assigned to the unblocking gearwheel 15, has a cross-recessed internal cross-sectional area, wheras the right half assigned to the driving gearwheel 14 has the conventional cylindrical internal cross-sectional area. The bearing sleeve 37 lodges on a bearing bolt 38 passing transversely through the convexity 5 and being cross-shaped in cross-section (FIG. 4). As a result, the pawl 16 is fixed against rotation to the bearing bolt 38 which is integrally formed on one side wall 25 of the convexity 5. The bearing sleeve 37 and the bearing bolt 38 are aligned for the pawl 16 in its position of rest to take the position shown in solid lines in FIGS. 2 and 3. The plate body 35 of the pawl 16 has a curvature bent in the direction of engagement E about a neutral axis extending in parallel to the axis of rotation D of the gearwheels 14, 15. On its half facing the unblocking gearwheel 15 (the left half in FIG. 4), the pawl 16 is further provided with a reinforcing fib 39 projecting downward and extending on the lateral edge 44 of the plate body 35 and with a projection 40 on the free end 33 extending in the direction of engagement E.

Proceeding from the side wall 25 a lateral stop 41 is provided on the side of the driving gearwheel 14; it is formed by a rib 42 extending between the bearing sleeve 37 and the driving gearwheel 14. The rib 42 extends about at right angles to the pawl 16. The stop 41 is so narrow that it backs the pawl 16 only very close to the latter's edge 43, as shown in solid lines in FIG. 1.

The functioning of the ratchet mechanism 6 is explained in detail below:

For the normal extraction of the telescopic arm 3, the handwheel 17 is rotated counter-clockwise as referred to FIGS. 2 and 3. The driving gearwheel 14 being correspondingly driven, the telescopic arm is moved outward by way of the gearing with the tooth webs 12. The pawl 16 is actuated counter to its direction of engagement E by the teeth 28 of the driving gearwheel 14, ratcheting over the teeth 28 and 30 of the driving gearwheel 14 and the unblocking gearwheel 15. The bearing sleeve 37 and the bearing bolt 38 being assembled against rotation, these two components get twisted, effecting a restoring force on the pawl 16 in the direction of engagement E.

For the regular retraction of the telescopic arm 3, the handwheel 17 is rotated clockwise. Normally, there would be the blocking effect by the pawl 16 engaging with the tooth gap 29 between two teeth 28 of the driving gearwheel 14. This is when the unblocking gearwheel 15 takes functional action. As a result of the confined rotatability of the unblocking gearwheel 15 relative to the driving gearwheel 14, the fiat flanks 32 of the teeth 28 of the unblocking gearwheel 15 are in clockwise advance of the corresponding flanks 32 of the teeth 28 of the driving gearwheel 14, lifting the pawl 16 counter to the latter's direction of engagement E out of the gaps 29 and 34, respectively. This is shown in dashed lines in FIG. 3. The blocking effect of the pawl 16 is thus cancelled, clockwise rotation of the driving gearwheel 14 and consequently the retraction of the telescopic arm 13 being possible. As a result of the above-mentioned convex design of the fiat flanks 32 of the unblocking gearwheel 15, the disengagement of the pawl 16 is additionally facilitated.

When a high force is inappropriately applied to the telescopic arm 3 in the push-in direction, the pawl 16 supports itself on the corresponding tooth 28 of the driving gearwheel 14. Simultaneously, the pawl 16 is acted upon in the direction of engagement E and comes to rest on the stop 41 of the rib 42. Consequently the push-in movement is blocked. If, however, a very high force is used, exceeding a certain limit, the pawl 16 is deformed so strongly on the side assigned to the driving gearwheel 14 (right half of FIG. 4) that it gets twisted and that in particular the edge 43 located on this side shifts inwardly. This defined deformation is facilitated in that in contrast to the left half of the pawl 16, no reinforcing measures such as the reinforcing rib 39 are provided on the right half. Consequently, this edge 43 can slip past the stop 41 and the pawl 16 can be displaced in the direction of engagement beyond its position of engagement with the driving gearwheel 14 shown in FIG. 2 into the position shown in dashed lines. The blocking effect is thus cancelled and the driving gearwheel 14 and the telescopic arm 3 are released. Upon the retraction of the arm 3, the pawl 16 again ratchets over the teeth 28 of the driving gearwheel 14.

In order to move the pawl 16 again into the position of rest shown in FIG. 2, it is sufficient to rotate the driving gearwheel 14 counterclockwise, whereupon one of the latter's teeth 28 drives the pawl 16 into the position of rest, the latter's deformation being cancelled. The ratchet mechanism 6 is again fully operable.

FIG. 6 shows an alternative configuration of the ratchet mechanism 6 that has proved even more operable in practice than the ratchet mechanism 6 according to FIGS. 1 to 5. Since the essential structure of the ratchet mechanism 6 according to FIG. 6 does not differ substantially from that of the ratchet mechanism according to FIGS. 1 to 5, the following is only an explanation of the differences in design and function:

The teeth 28 of the driving gearwheel 14 are about semicircular in profile, projecting less than the corresponding teeth of the driving gearwheel of the first embodiment. Moreover, blind-hole-type recesses 45 extending parallel to the flanks 32' and increasing the flexibility of the teeth 28 are provided in the embodiment according to FIG. 6.

Further, the rib 42 constituting the stop 41 is designed to be wider in the direction parallel to the axis of rotation D of the gearwheels 14, 15 so that the stop 41 can support not only the edge of the pawl 16, but about one third of its width. This is roughly outlined by the dashed contour of the rib 42 in FIG. 1.

As for the pawl 16 itself, the projection 40 on the free end 33 extends over the entire width of the pawl 16. This is likewise roughly outlined by dashed contours in FIG. 4.

As seen in FIG. 6, the stop 41 is positioned such that the projection 40 of the pawl 16 cannot engage with the tooth gap 29 as far as to the latter's bottom. Thus, the depth of engagement of the pawl 16 is defined such that upon the application of a force exceeding the limit mentioned at the outset in the push-in direction of the telescopic arm 3 and the resulting geared clockwise rotation—as referred to FIG. 6—of the driving gearwheel 14, the pawl 16 is actuated by the corresponding tooth 28 such that it is elastically deformed, as outlined in dashed lines in FIG. 6. As a result of this deformation the pawl 16 moves outward counter to the direction of engagement E until disengaging from the corresponding tooth gap 29 counter to the direction of engagement E. The driving gearwheel 14 can be further rotated by another tooth gap, after which the process just described is repeated. All in all, the telescopic arm 3 can be retracted upon the application of a force exceeding the limit without the pawl 16 being damaged.

The function of the ratchet mechanism shown in FIG. 6 during the regular retraction and extraction of the telescopic arm by actuation of the handwheel 17 does not differ from the function of the ratchet mechanism shown in FIGS. 1 to 5. In this regard there is no need of any further explanation.

What is claimed is:

1. A ratchet mechanism for telescope devices on toy vehicles, in particular for telescope supports (1) of crane jibs on toy crane trucks, comprising:

a manually drivable driving gearwheel (14) rotatably positioned on a telescope base body (2), a rack-type row of teeth (rack 12) engaging with the driving gearwheel (14) and disposed on a telescope arm (3) which is lodged for longitudinal displacement in the telescope base body (2), and a pawl (16) being in ratcheting engagement with a tooth gap (29) between two teeth (28) of the driving gearwheel (14) for the telescopic arm (3) to be fixed in different positions of displacement on the telescope base body (2), wherein the pawl (16) consists of elastically flexible plastics so that on the one hand, upon actuation of the driving gearwheel (14) for an extraction of the telescopic arm (3), it ratchets over the teeth (28) of the driving gearwheel (14) while being deflected counter to a direction of engagement (E), and on the other hand, upon actuation of the telescopic arm (3) in a direction of retraction by a force exceeding a limit, it is elastically deformable in a defined manner such that the pawl (16) again ratchets over the teeth (28) of the driving gearwheel (14) while releasing the telescopic arm (3) in the latter's direction of retraction.

2. A ratchet mechanism for telescope devices on toy vehicles, comprising:

a manually drivable driving gearwheel rotatably positioned on a telescope base body;

a rack-type row of teeth engaging with the driving gearwheel and disposed on a telescope arm which is lodged for longitudinal displacement in the telescope base body; and a pawl being in ratcheting engagement with a tooth gap between two teeth of the driving gearwheel for the telescopic arm to be fixed in different positions of displacement on the telescope base body, said pawl having a plate bent in a direction of engagement (E) about a neutral axis extending parallel to an axis of rotation (D) of the driving gearwheel, which plate is provided with a bearing end and a bearing sleeve on the bearing end, the bearing sleeve resting non-rotatably on an elastically twistable bearing axle on the telescope base body;

said pawl consists of elastically flexible plastics so that on the one hand, upon actuation of the driving gearwheel for an extraction of the telescopic arm, said pawl ratchets over the teeth of the driving gearwheel while being deflected counter to the direction of engagement (E), and on the other hand, upon actuation of the telescopic arm in a direction of retraction by a force exceeding a limit, said pawl is elastically deformable in a defined manner such that the pawl again ratchets over the teeth of the driving gearwheel while releasing the telescopic arm in the latter's direction of retraction.

3. A ratchet mechanism for telescope devices on toy vehicles, comprising:

a manually drivable driving gearwheel rotatably positioned on a telescope base body;

a rack-type row of teeth engaging with the driving gearwheel and disposed on a telescope arm which is lodged for longitudinal displacement in the telescope base body; and a pawl being in ratcheting engagement with a tooth gap between two teeth of the driving gearwheel for the telescopic arm to be fixed in different positions of displacement on the telescope base body;

said pawl consists of elastically flexible plastics so that on the one hand, upon actuation of the driving gearwheel for an extractions of the telescopic arm, said pawl ratchets over the teeth of the driving gearwheel while being deflected counter to a direction of engagement (E), and on the other hand, upon actuation of the telescopic arm in a direction of retraction by a force exceeding a limit, said pawl is elastically deformable in a defined manner such that the pawl again ratchets over the teeth of the driving gearwheel while releasing the telescopic arm in the latter's direction of retraction;

a stop is provided on the telescope base body upstream of a side of the pawl oriented in the direction of engagement (E), the stop defining a depth of engagement of the pawl with the tooth gap of the driving gearwheel such that, upon application of a force exceeding a limit in the direction of retraction of the telescopic arm, the pawl is disengageable by intrinsic elastic deformation for a release of the driving gearwheel counter to the direction of engagement (E).

4. A ratchet mechanism according to claim 3, wherein the teeth (28) of the driving gearwheel (14) are provided with a blind-hole-type recess (45) extending parallel to flanks (32') of the teeth (28) for increasing the flexibility of the teeth (28).

5. A ratchet mechanism for telescope devices on toy vehicles, comprising:

a manually drivable driving gearwheel rotatably positioned on a telescope base body;

a rack-type row of teeth engaging with the driving gearwheel and disposed on a telescope arm which is lodged for longitudinal displacement in the telescope base body; and a pawl being in ratcheting engagement with a tooth gap between two teeth of the driving gearwheel for the telescopic arm to be fixed in different positions of displacement on the telescope base body;

said pawl consists of elastically flexible plastics so that on the one hand, upon actuation of the driving gearwheel for an extraction of the telescopic arm, said pawl ratchets over the teeth of the driving gearwheel while being deflected counter to a direction of engagement (E), and on the other hand, upon actuation of the telescopic arm in a direction of retraction by a force exceeding a limit, said pawl is elastically deformable in a defined manner such that the pawl again ratchets over the teeth of the driving gearwheel while releasing the telescopic arm in the latter's direction of retraction;

a stop is provided on the telescope base body upstream of a lateral edge of a side of the pawl oriented in the direction of engagement (E), which stop constitutes an abutment for the pawl upon the latter's deformation in the direction of engagement (E), the pawl being deformable upon application of a force exceeding a limit in a direction of retraction of the telescopic arm in such a way that the pawl is displaceable past the stop in the direction of engagement (E) beyond its position of engagement with the driving gearwheel.

6. A ratchet mechanism for telescope devices on toy vehicles, comprising:

a manually drivable driving gearwheel rotatably positioned on a telescope base body;

a rack-type row of teeth engaging with the driving gearwheel and disposed on a telescope arm which is lodged for longitudinal displacement in the telescope base body; and a pawl being in ratcheting engagement with a tooth gap between two teeth of the driving gearwheel for the telescopic arm to be fixed in different positions of displacement on the telescope base body;

said pawl consists of elastically flexible plastics so that on the one hand, upon actuation of the driving gearwheel for an extraction of the telescopic arm, said pawl ratchets over the teeth of the driving gearwheel while being deflected counter to a direction of engagement (E), and on the other hand, upon actuation of the telescopic arm in a direction of retraction by a force exceeding a limit, said pawl is elastically deformable in a defined manner such that said pawl again ratchets over the teeth of the driving gearwheel while releasing the telescopic arm in the latter's direction of retraction;

an unblocking gearwheel coupled with the driving gearwheel and of identical pitch is disposed coaxially with the driving gearwheel, flatly ascending flanks of said unblocking gearwheel actuating the pawl counter to the direction of engagement (E) for unblocking the ratchet mechanism upon the actuation of the mechanism for the retraction of the telescopic arm.

7. A ratchet mechanism according to claim 6, wherein the driving gearwheel (14) and the unblocking gearwheel (15) are rotatable relative to each other for a defined angle of rotation such that, upon actuation of the ratchet mechanism (6) for a retraction of the telescopic arm (3), the flatly ascending flanks (32) of the unblocking gearwheel (15) are in advance of corresponding flanks (32') of the driving gearwheel (14).

8. A ratchet mechanism according to claim 6, wherein on a side engaging with the unblocking gearwheel (15), the pawl (16) is provided with a reinforcing rib (39).

9. A ratchet mechanism according to claim 6, wherein a free end (33) of the pawl (16) is provided with a projection (40) oriented in the direction of engagement (E).

10. A ratchet mechanism according to claim 9, wherein the pawl (16) is provided with the projection (40) only on its side engaging with the unblocking gearwheel (15).

11. A toy truck comprising:

a manually drivable driving gearwheel rotatably positioned on a telescope base body;

a rack-type row of teeth engaging with the driving gearwheel and disposed on a telescope arm which is lodged for longitudinal displacement in the telescope base body;

a pawl being in ratcheting engagement with a tooth gap between two teeth of the driving gearwheel for the telescopic arm to be fixed in different positions of displacement on the telescope base body;

said pawl consists of elastically flexible plastics so that on the one hand, upon actuation of the driving gearwheel for an extraction of the telescopic arm, said pawl ratchets over the teeth of the driving gearwheel while being deflected counter to a direction of engagement (E), and on the other hand, upon actuation of the telescopic arm in a direction of retraction by a force exceeding a limit, said pawl is elastically deformable in a defined manner such that the pawl again ratchets over the teeth of the driving gearwheel while releasing the telescopic arm in the latter's direction of retraction.

12. A toy telescope support comprising:

a manually drivable driving gearwheel rotatably positioned on a telescope base body;

a rack-type row of teeth engaging with the driving gearwheel and disposed on a telescope arm which is lodged for longitudinal displacement in the telescope base body;

a pawl being in ratcheting engagement with a tooth gap between two teeth of the driving gearwheel for the telescopic arm to be fixed in different positions of displacement on the telescope base body;

said pawl consists of elastically flexible plastics so that on the one hand, upon actuation of the driving gearwheel for an extraction of the telescopic arm, said pawl ratchets over the teeth of the driving gearwheel while being deflected counter to a direction of engagement (E), and on the other hand, upon actuation of the telescopic arm in a direction of retraction by a force exceeding a limit, said pawl is elastically deformable in a defined manner such that the pawl again ratchets over the teeth of the driving gearwheel while releasing the telescopic arm in the latter's direction of retraction.

\* \* \* \* \*